United States Patent Office 2,925,302
Patented Feb. 16, 1960

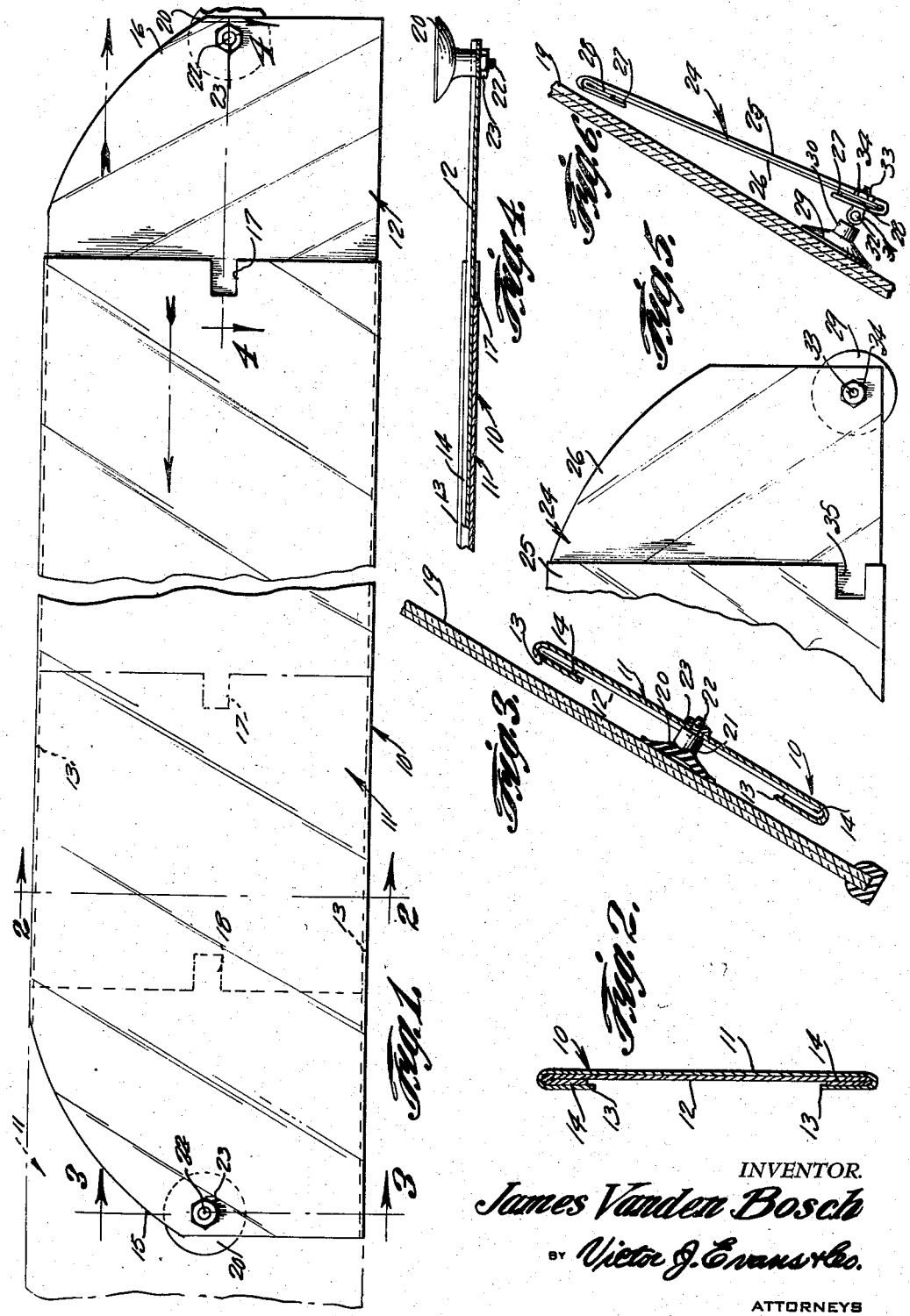

2,925,302
REFLECTION ARRESTOR
James Vanden Bosch, Jenison, Mich.

Application March 19, 1958, Serial No. 722,594

2 Claims. (Cl. 296—97)

This invention relates to a glare shield or reflection arrestor.

The object of the invention is to provide a reflection arrestor which is adapted to be connected to the windshield of a vehicle such as an automobile, truck or bus, so that glare from the sun's ray will be shielded from the eyes of the driver or other occupant of the vehicle.

Another object of the invention is to provide a reflection arrestor which is adapted to be made of a suitable material such as transparent or translucent plastic, and wherein the reflection arrestor includes a plurality of members which are telescopically or slidably connected together so that the effective size of the arrestor can be varied as desired, and wherein the reflection arrestor is adapted to be connected to the vehicle windshield by means of suction cups so that when the device is not needed, it can be readily removed from the windshield and stored in a convenient location.

A further object of the invention is to provide a reflection arrestor which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view illustrating the reflection arrestor of the present invention.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a fragmentary elevational view illustrating a modified reflection arrestor.

Figure 6 is an end elevational view of the reflection arrestor of Figure 5.

Referring in detail to the drawings, and more particularly to Figures 1 through 4 of the drawings, the numeral 10 indicates the reflection arrestor of the present invention, and the arrestor 10 includes a support member 11 and a body member 12, and these members 11 and 12 are slidably or telescopically connected together. These members are adapted to be made of a suitable transparent or translucent material such as a colored plastic material.

As shown in the drawings, the support member 11 is provided with flanges 13 which are arranged along the longitudinal side edges thereof, and these flanges define trackways for slidably receiving therein the flanged side edge portions 14 of the body member 12.

As shown in the drawings, the outer upper corner of the support member 11 is rounded as at 15, and the outer upper corner of the body member 12 is also rounded or shaped arcuately as at 16. The end of the support member 11 opposite to the end having the rounded corner 15 is provided with a recess or groove 17, and the end of the body member 12 opposite to the end having the rounded corner 16 is provided with a similar groove 18, and these grooves 17 and 18 are provided for a purpose to be later described.

In the drawings, the numeral 19 designates a portion of the vehicle windshield, and the reflection arrestor is adapted to be arranged adjacent the inner surface of the windshield 19 so that glare from the sun's rays or the like will be shielded from the driver or other persons in the vehicle.

A means is provided for detachably connecting the arrestor 10 to the windshield 19, and this means comprises suction cups 20, Figure 3, and each suction cup 20 includes a cylindrical shank portion 21 which has a threaded stem or bolt 22 extending therefrom, and the stems 22 project through suitable openings in the support member 11 and body member 12, the suction cups being arranged adjacent the ends of the members not having the grooves 17 and 18 therein. The numeral 23 indicates a securing element such as a nut which is arranged in threaded engagement with each stem 22, and it will be seen that the grooves 17 and 18 are positioned in the edges of the support member 11 and body member 12 so that the grooves 17 and 18 are in alinement with the securing elements 23 so that the grooves 17 and 18 snugly receive therein the nuts or securing elements 23 when the body member 12 and support member 11 are in their closed position.

Referring now to Figures 5 and 6 of the drawings, there is illustrated a modified reflection arrestor which is indicated generally by the numeral 24, and the reflection arrestor 24 includes a support member 25 and a body member 26, and these members are telescopically or slidably connected together. The support member 25 is provided with trackways 27 which slidably receive therein the flanged portions 28 of the body member 26, Figure 6. In Figures 5 and 6 the suction cups 29 are connected to the lower outer ends of the support member 25 and body member 26 and are adapted to be used for connecting the arrestor 24 to the windshield 19, and the suction cups 29 each include a shank portion 30. The numeral 31 indicates lugs which are pivotally connected to the shank portions 30 by means of pivot pins 32, and a threaded stem 33 projects from each lug 31, there being a securing element or nut 34 on the stem 33. Grooves 35 are provided in the ends of the support member 25 and body member 26 opposite to the ends thereof to which the suction cups 29 are secured, and the grooves 35 are in alinement with the suction cups 29 for receiving the nuts 34 when the body member and support member are moved together so that the grooves 35 will provide sufficient clearance for the nuts in the same manner as the previously described grooves 17 or 18.

From the foregoing, it is apparent that there has been provided a reflection arrestor for use with a vehicle such as an automobile so that light rays or the sun's rays will be shielded from the eyes of the driver or other occupant of a vehicle. According to the present invention the arrestor 10 shown in Figures 1 through 4 consists of the support member 11 and body member 12 which are slidably connected together and this arrangement permits the arrestor to be extended or retracted so that different areas or portions of the windshield can be shielded as desired. The arrestor is detachably connected to the windshield 19 by means of the suction cups 20, and this arrangement permits the arrestor to be readily removed from the windshield 19 when the arrestor is not needed or required. The arrestor includes the body member 12 and the support member 11, and these members are adapted to be made of a suitable material such as a transparent or translucent plastic material which may be colored. The trackways 13 on the edges of the support member 11 are adapted to have the flanged portions 14 of the body member 12 slide therein so that the body member 12 will be properly guided as it is moved back and forth. Furthermore, the nuts 23 on the bolts or stems 22 are adapted to be snugly received in the grooves 17 or 18 when the parts are in their innermost position so that there will be no protruding or projecting parts when the device is in folded or collapsed position. The rounded corners such as the corners 15 and 16 provide a construction which conforms to the contour of the vehicle and also provides a highly attractive arrangement. When the arrestor 10 is to be used, the members 11 and 12 can be separated or moved apart to the desired position, and then the arrestor 10 is connected to the vehicle windshield 19 by means of the suction cups 20 so that the parts will remain immobile in their adjusted position. When the device is not needed, the member or unit can be removed from the windshield and then the members 11 and 12 can be moved to folded or retracted position whereby the entire device can be conveniently stored in the glove compartment or other location.

In the arrestor 24 shown in Figures 5 and 6, the pin 32 provides a pivotal connection between the suction cups 29 and the body member and support member and this arrangement permits the arrestor to be moved to different angular positions with respect to the windshield 19 since the members 25 and 26 can be pivoted about an axis extending through the pin 32. The trackways 27 on the support member 25 provide a sliding support for the flanges 28 of the body member 26.

The parts can be made of any suitable material and in different shapes or sizes.

The telescopic arrangement between the body member and support member permits the arrestor to be moved to different lengths or sizes when it is being used, and when the device is not being used, the parts can be moved together so as to occupy a minimum amount of space for storage or shipment. When the device is not being used, it can be connected to the conventional sun visor by means of a clip or the like, or else it can be stored in the vehicle glove compartment. The device is very inexpensive to make and sell and the device will serve to eliminate the glare hazard which often causes serious accidents. The device is simple to install and remove and the parts can be made in different colors.

As previously stated, the straight suction cups 20 may be used, or else a hinged arrangement may be utilized as shown in Figures 5 and 6. Instead of using two members such as a single body member and a single support member, the number of sections or members can be varied as desired or required. The material for making the parts is preferably to be a thin rigid plastic material, but it is to be understood that the present invention is not restricted to any particular material.

Thus, it will be seen that the reflection arrestor of the present invention will provide a shielding means for vehicles having windshields so that persons in the vehicle will be shielded from the suns rays which may strike the hood of the vehicle and also such persons will be shielded from any other glare caused by bright sun striking any surface such as snow, ice, water or the like so that the driver will not be temporarily blinded by the glare and also the person will be able to operate the vehicle with greater comfort and with less fatigue since the eyes will not become tired from such glare. Furthermore, the device will shield the eyes from light rays from oncoming vehicles and there will be no interference with safe driving since the driver's views will not be obstructed. The device can be readily removed when it is not being used and the device is highly attractive so that it will enhance the appearance of the vehicle. Suitable stop means may be provided for preventing the members 11 and 12 from being pulled entirely apart.

The above description of the invention is for illustrative purposes only and it is understood that modifications may be made in the construction within the scope and spirit of the following claims.

I claim:

1. In a reflection arrestor, a support member including a rounded outer upper corner, a trackway on each longitudinal edge of the support member, there being a groove in the end of the support member opposite to the end having the upper rounded corner, a body member telescopically connected to said support member and said body member having flanged edge portions slidably mounted in said trackways, said body member having a rounded outer upper corner and a groove in the end opposite to the end having the upper rounded corner, suction cups connected to said support member and body member, so that said cups are in alinement with the grooves in the ends of said support member and said body member, said suction cups each including a shank portion, a threaded stem extending from each shank portion and projecting through the support member and body member adjacent the ends of said support member and body member having the rounded outer upper corners, securing elements threadedly engaging said stems, and the grooves in the ends of said support member and body member selectively receiving said securing elements when said body member is telescopically moved in relation to said support member.

2. In a reflection arrestor, a support member, a trackway on each longitudinal edge of the support member, there being a groove in an end of the support member, a body member telescopically connected to said support member and said body member having flanged edge portions slidably mounted in said trackways, there being a groove in an end of the body member, suction cups each including a shank portion, lugs pivotally connected to said shank portions, stems extending from said lugs and projecting through the body member and support member at the ends opposite to the ends having grooves therein and said stems being in alinement with said grooves, securing elements engaging said stems, said grooves being positioned in the inner ends of said support member and body member so that when said body member is telescopically moved in relation to said support member said grooves will selectively receive said securing elements that are positioned in the outer ends of said support member and body member, and said suction cups adapted to engage a vehicle windshield.

References Cited in the file of this patent

UNITED STATES PATENTS

| | | |
|---|---|---|
| 2,120,892 | Francis | June 14, 1938 |
| 2,252,716 | Levy | Aug. 19, 1941 |
| 2,445,473 | Constant | July 20, 1948 |
| 2,568,046 | Wilkinson | Sept. 18, 1951 |
| 2,711,923 | Parks | June 28, 1955 |

FOREIGN PATENTS

| | | |
|---|---|---|
| 577,768 | France | June 12, 1924 |